(12) United States Patent
Ohno et al.

(10) Patent No.: US 12,461,026 B2
(45) Date of Patent: Nov. 4, 2025

(54) OPTICAL INSPECTION METHOD, NON-TRANSITORY STORAGE MEDIUM STORING OPTICAL INSPECTION PROGRAM, PROCESSING DEVICE, AND OPTICAL INSPECTION APPARATUS

(71) Applicant: KABUSHIKI KAISHA TOSHIBA, Tokyo (JP)

(72) Inventors: Hiroshi Ohno, Tokyo (JP); Hiroya Kano, Kawasaki Kanagawa (JP); Hideaki Okano, Yokohama Kanagawa (JP); Takahiro Kamikawa, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 167 days.

(21) Appl. No.: 17/823,957

(22) Filed: Sep. 1, 2022

(65) Prior Publication Data
US 2023/0304929 A1    Sep. 28, 2023

(30) Foreign Application Priority Data
Mar. 22, 2022  (JP) ................. 2022-045295

(51) Int. Cl.
G01N 21/47 (2006.01)
G01N 21/25 (2006.01)
G01N 21/27 (2006.01)

(52) U.S. Cl.
CPC ....... *G01N 21/4738* (2013.01); *G01N 21/255* (2013.01); *G01N 21/27* (2013.01)

(58) Field of Classification Search
CPC .... G01N 21/47; G01N 21/4738; G01N 21/88; G01N 21/8806; G01N 2021/8845
See application file for complete search history.

(56) References Cited

U.S. PATENT DOCUMENTS 5,675,407 A    10/1997   Geng
7,353,954 B1 *  4/2008   Malek .................... G02B 13/22
                                              209/922

(Continued)

FOREIGN PATENT DOCUMENTS

JP    2008-209726 A    9/2008
JP    2019-124542 A    7/2019

(Continued)

OTHER PUBLICATIONS

Ohno, One-shot color mapping imaging system of light direction extracted from a surface BRDF (Year: 2020).*

(Continued)

*Primary Examiner* — Uzma Alam
*Assistant Examiner* — Justin J Van Cleave
(74) *Attorney, Agent, or Firm* — Finnegan, Henderson, Farabow, Garrett & Dunner, LLP

(57) ABSTRACT

According to the embodiment, an optical inspection method includes: acquiring an image by capturing the image, using light from a surface of an object, which passes through a wavelength selection portion configured to selectively pass light components of a plurality of predetermined wavelengths different from each other, the image sensor including color channels configured to discriminately receive the light components of the plurality of predetermined wavelengths, performing color count estimation processing configured to estimate the number of colors based on the intensity ratio of the color channels that have received the light in each pixel of the image, and performing scattered light distribution identification processing configured to identify a scattered light distribution as BRDF from the surface of the object based on the number of colors or surface state identification processing configured to identify a state of the surface of the object based on the number of colors.

12 Claims, 9 Drawing Sheets

(56) References Cited

U.S. PATENT DOCUMENTS

| | | | |
|---|---|---|---|
| 10,732,102 B2 | 8/2020 | Ohno et al. | |
| 10,812,786 B2 | 10/2020 | Ohno et al. | |
| 2010/0088201 A1* | 4/2010 | Nagarajan | G06Q 30/04 |
| | | | 705/29 |
| 2014/0193042 A1* | 7/2014 | Allen | G06T 7/0004 |
| | | | 382/108 |
| 2016/0040985 A1* | 2/2016 | Nagai | G01J 3/2823 |
| | | | 356/600 |
| 2020/0408684 A1* | 12/2020 | Kato | G01N 21/57 |
| 2021/0131961 A1 | 5/2021 | Ohno et al. | |
| 2022/0003980 A1* | 1/2022 | Dholakia | G02B 21/367 |
| 2022/0025784 A1* | 1/2022 | Ren | F01D 25/285 |
| 2022/0086326 A1 | 3/2022 | Ohno et al. | |

FOREIGN PATENT DOCUMENTS

| | | |
|---|---|---|
| JP | 2019-203796 A | 11/2019 |
| JP | 2021-76423 A | 5/2021 |

OTHER PUBLICATIONS

Rahmlow, Hyperspectral imaging using a linear variable filter based ultra-compact camera (Year: 2020).*

Howes, Rainbow Schlieren and its applications, 1984 (Year: 1984).*

W.L. Howes "Rainbow schlieren and its applications," Applied Optics, vol. 23, No. 14, pp. 2449-2460 (1984).

Jun-Sik Kim et al., "Multiaperture telecentric lens for 3D reconstruction," Optics Letters, vol. 36, No. 7, pp. 1050-1052 (2011).

P.S. Greenberg et al. "Quantitative rainbow schlieren deflectometry," Applied Optics, vol. 34, No. 19, pp. 3810-3822 and 3 pages of color figures (1995).

H. Ohno et al., "One-shot BRDF imaging system to obtain surface properties," Optical Review, vol. 28, pp. 655-661 (2021).

Hiroshi Ohno et al., "One-shot BRDF imaging system to obtain surface properties," Optical Review, vol. 28, pp. 655-661, DOI: 10.1007/s10043-021-00689-x (2021).

Japan Patent Office, Office Action in JP App. No. 2022-045295, 2 pages, and machine translation, 2 pages (Mar. 4, 2025).

* cited by examiner

OPTICAL INSPECTION METHOD, NON-TRANSITORY STORAGE MEDIUM STORING OPTICAL INSPECTION PROGRAM, PROCESSING DEVICE, AND OPTICAL INSPECTION APPARATUS

CROSS-REFERENCE TO RELATED APPLICATIONS

This application is based upon and claims the benefit of priority from Japanese Patent Application No. 2022-045295, filed Mar. 22, 2022, the entire contents of all of which are incorporated herein by reference.

FIELD

Embodiments described herein relate generally to an optical inspection method, a non-transitory storage medium storing an optical inspection program, a processing device, and an optical inspection apparatus.

BACKGROUND

In various industries, surface measurement of an object in a noncontact state is important. As a conventional method, there exists a method in which an object is illuminated with spectrally divided light beams, an imaging element acquires each spectrally divided image, and the direction of each light beam is estimated, thereby acquiring the information of the object surface.

It is an object of an embodiment to provide an optical inspection method for acquiring the information of the surface of an object, a non-transitory storage medium storing an optical inspection program, a processing device, and an optical inspection apparatus.

DETAILED DESCRIPTION

Figure 1:
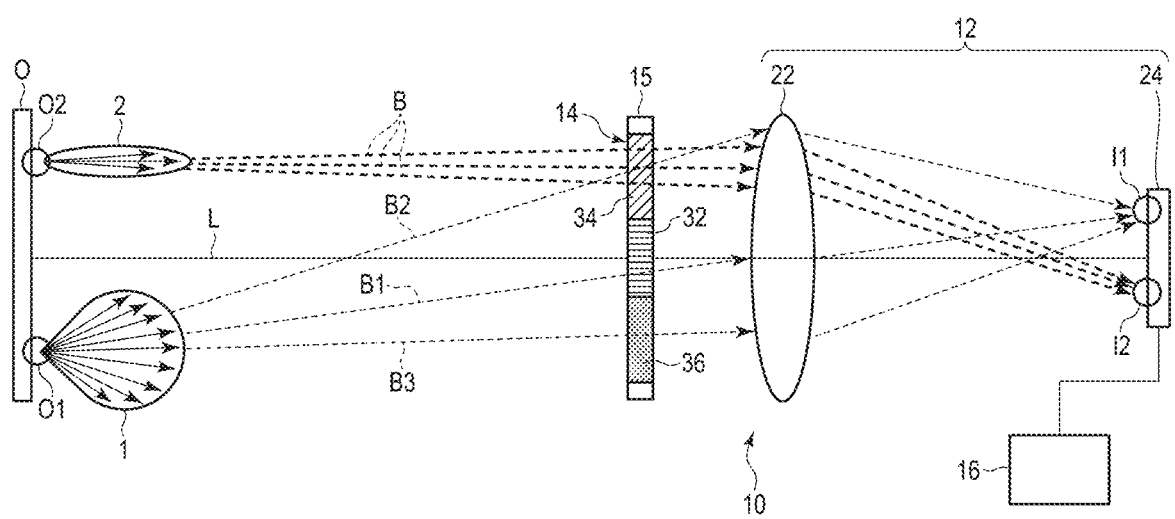
FIG. 1 is a schematic sectional view showing the schematic configuration of an optical inspection apparatus according to the first embodiment.

It is an object of an embodiment to provide an optical inspection method for acquiring the information of the surface of an object, a non-transitory storage medium storing an optical inspection program, a processing device, and an optical inspection apparatus.

According to the embodiment, an optical inspection method includes: acquiring an image by capturing the image with an image sensor, using light from a surface of an object, which passes through a wavelength selection portion configured to selectively pass light components of a plurality of predetermined wavelengths different from each other, the image sensor including color channels configured to discriminately receive the light components of the plurality of predetermined wavelengths, performing color count estimation processing configured to estimate the number of colors based on the intensity ratio of the color channels that have received the light in each pixel of the image, and performing at least one of scattered light distribution identification processing configured to identify a scattered light distribution as Bidirectional Reflectance Distribution Function (BRDF) from the surface of the object based on the number of colors and surface state identification processing configured to identify a state of the surface of the object based on the number of colors.

Embodiments will now be described with reference to the accompanying drawings. The drawings are schematic or conceptual, and the relationship between the thickness and the width of each part, the size ratio between parts, and the like do not always match the reality. Also, even same portions may be illustrated in different sizes or ratios depending on the drawing. In the present specification and the drawings, the same elements as described in already explained drawings are denoted by the same reference numerals, and a detailed description thereof will appropriately be omitted.

In this specification, light is a kind of electromagnetic wave, and includes X-rays, ultraviolet rays, visible light, infrared rays, microwaves, and the like. In this embodiment, it is assumed that the light is visible light, and for example, the wavelength is in a region of 450 nm to 700 nm.

First Embodiment

An optical inspection apparatus 10 according to this embodiment will be described with reference to FIGS. 1 and 2.

Figure 2:
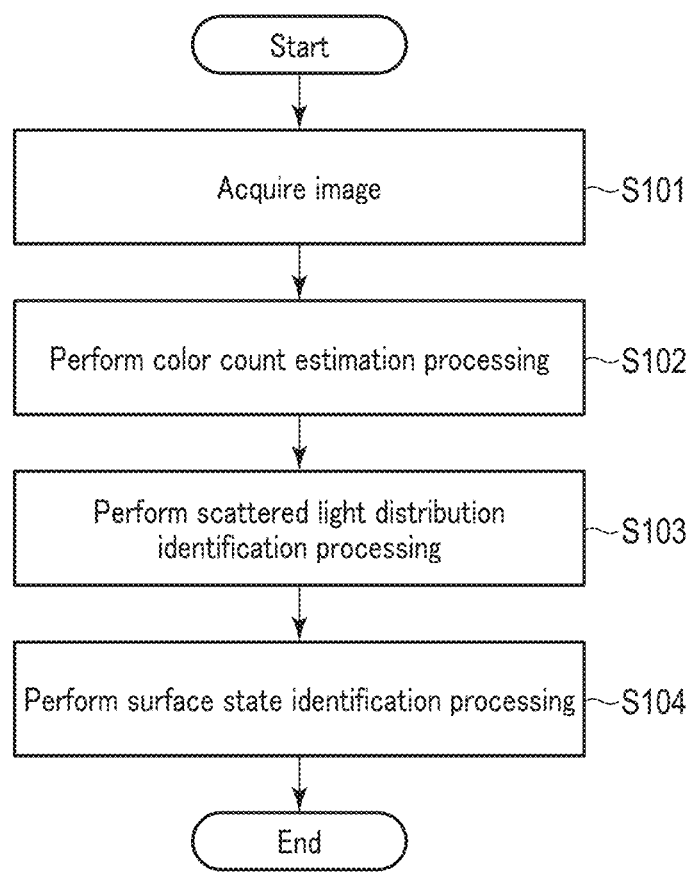
FIG. 2 is a flowchart for explaining the processing procedure of the processing device of the optical inspection apparatus shown in FIG. 1.

FIG. 1 shows a schematic sectional view including an optical axis L of the optical inspection apparatus 10 according to this embodiment. As shown in FIG. 1, the optical inspection apparatus 10 includes an imaging portion 12, a wavelength selection portion 14, and a processing device 16.

The imaging portion 12 includes an imaging optical element 22 with the optical axis L, and an image sensor (imaging element) 24.

The imaging optical element 22 is provided between the wavelength selection portion 14 and the image sensor 24. The imaging optical element 22 is, for example, an imaging lens. In FIG. 1, the imaging lens of the imaging optical element 22 is schematically drawn and represented by one lens but may be a lens set formed by a plurality of lenses. Alternatively, the imaging optical element 22 may be a concave mirror, a convex mirror, or a combination thereof. That is, any optical element having a function of collecting, to a conjugate image point, a light beam group exiting from one point of an object, that is, an object point can be used as the imaging optical element 22.

Collecting (condensing) a light beam group exiting from an object point on an object surface to an image point by the imaging optical element 22 is called imaging. Alternatively, holding an imaging relationship means transferring an object point to an image point (the conjugate point of the object point). The aggregate plane of conjugate points to which a light beam group exiting from a sufficiently apart object point is transferred by the imaging optical element 22 will be referred to as the focal plane of the imaging optical element 22. Also, a line that is perpendicular to the focal plane and passes through the center of the imaging optical element 22 is defined as the optical axis L. At this time, the conjugate image point of the object point transferred by the light beam will be referred to as a focal point.

The image sensor 24 according to this embodiment includes at least one or more pixels, and each pixel can receive light beams of at least two different wavelengths, that is, the light beam of the first wavelength and the light beam of the second wavelength that is a wavelength different from the first wavelength. A plane including the region where the image sensor 24 is arranged is the image plane of the imaging optical element 22. The image sensor 24 can be either an area sensor or a line sensor. The area sensor is a sensor in which pixels are arrayed in an area on the same surface. The line sensor is a sensor in which pixels are linearly arrayed. Each pixel may include color channels configured to discriminately receive light components of a plurality of predetermined wavelengths, like three channels of R, G, and B. However, independent pixels may be provided for R, G, and B, respectively, and the pixels of R, G, and B may be considered together as one pixel. In this embodiment, the image sensor 24 is an area sensor, and each pixel includes two color channels of red and blue. That is, the image sensor 24 can receive blue light with a wavelength of 450 nm and red light with a wavelength of 650 nm by independent color channels.

The wavelength selection portion 14 selectively passes light components of a plurality of predetermined wavelengths. The wavelength selection portion 14 includes at least two or more wavelength selection regions 32, 34, and 36. The wavelength selection portion 14 shown in FIG. 1 includes the three wavelength selection regions 32, 34, and 36. In the cross section shown in FIG. 1, the wavelength selection regions 32 and 34 are adjacent. Also, in the cross section shown in FIG. 1, the wavelength selection regions 32 and 36 are adjacent.

Two wavelength selection regions of the wavelength selection portion 14 are defined as the first wavelength selection region 32 and the second wavelength selection region 34. The first wavelength selection region 32 passes a light beam having a wavelength spectrum including the first wavelength. Here, passing a light beam means making the light beam headed from the object point to the image point by transmission or reflection. In this embodiment, it is assumed that the first wavelength selection region 32 passes a light beam of a first wavelength in a specific range. On the other hand, the first wavelength selection region 32 substantially shields a light beam of a second wavelength different from the first wavelength. Here, shielding means not to cause the light beam to pass. That is, this means not to make the light beam headed from the object point to the image point. However, shielding also includes a case where the intensity of the light beam is greatly decreased, and a small number of remaining components are passed. The second wavelength selection region 34 passes a wavelength spectrum including the light beam of the second wavelength. On the other hand, the second wavelength selection region 34 substantially shields the light beam of the first wavelength. For example, the first wavelength is blue light with a wavelength of 450 nm, and the second wavelength is red light with a wavelength of 650 nm. However, the present invention is not limited to this, and any wavelengths can be used.

As described above, the wavelength selection regions 32 and 34 adjacent to each other pass/shield different wavelengths.

The distribution of directions of reflected light beams from the object point on the surface of an object O can be represented by a distribution function called a BRDF (Bidirectional Reflectance Distribution Function). The BRDF changes depending on the surface properties/shape of an object in general. For example, if the surface of the object O is rough, reflected light spreads in various directions. Hence, the BRDF represents a wide distribution. That is, if the surface of the object O is rough, the reflected light exists in a wide angle. On the other hand, if the surface of the object O is a mirror surface, reflected light includes almost only specular reflection components, and the BRDF represents a narrow distribution. As described above, the BRDF reflects the surface properties/shape of the surface of the object O. Here, the surface properties/shape of the object O may be a surface roughness, for example, fine unevenness on a micron order, tilt of the surface, or distortion. That is, any properties concerning the height distribution of the surface of the object O can be used as the surface properties/shape of the object O. If the surface properties/shape of the object O is formed by a fine structure, the typical structure scale can be any scale such as a nano-scale, a micron-scale, or a milli-scale.

The processing device 16 is formed by, for example, a computer, and includes a processor (processing circuit) and a non-transitory storage medium. The processor includes one of a CPU (Central Processing Unit), an ASIC (Application Specific Integrated Circuit), a microcomputer, an FPGA (Field Programmable Gate Array), and a DSP (Digital Signal Processor). In addition to a main storage device such as a memory, the non-transitory storage medium can include an auxiliary storage device. As the non-transitory storage medium, a nonvolatile memory capable of writing and reading as needed, such as an HDD (Hard Disk Drive), an SSD (Solid State Drive), a magnetic disk, an optical disk (a CD-ROM, a CD-R, a DVD, or the like), a magnetooptical disk (an MO or the like), a semiconductor memory, or the like can be used.

In the processing device 16, only one processor and one storage medium may be provided, or a plurality of processors and a plurality of storage media may be provided. In the processing device 16, the processor executes a program and the like stored in the non-transitory storage medium, thereby performing processing. The program executed by the processor of the processing device 16 may be stored in a computer (server) connected to the processing device 16 via a network such as the Internet, or a server in a cloud environment. In this case, the processor downloads the program via the network. In the processing device 16, image acquisition from the image sensor 24 and various kinds of calculation processing based on the image acquired from the image sensor 24 are executed by the processor and the like, and the non-transitory storage medium functions as a data storage unit.

In addition, at least part of the processing of the processing device 16 may be executed by a cloud server constituted in a cloud environment. The infrastructure of the cloud environment is formed by a virtual processor such as a virtual CPU and a cloud memory. In an example, image acquisition from the image sensor 24 and various kinds of calculation processing based on the image acquired from the image sensor 24 are executed by the virtual processor, and the cloud memory functions as a data storage unit.

Note that in this embodiment, the processing device 16 controls the image sensor 24, and also performs various kinds of operations for image data obtained from the image sensor 24.

Under the above-described configuration, the operation principle of the optical inspection apparatus 10 according to this embodiment will be described with reference to FIGS. 1 and 2. FIG. 2 shows the optical inspection processing procedure of acquiring the information of the surface of the object O using the processing device 16. Note that in this embodiment, assume that the third wavelength selection region 36 shown in FIG. 1 is shielded.

Referring to FIG. 1, assume that, for example, an uneven defect in a micron size exists at a first object point O1 on the surface of the object O, and a second object point O2 on the surface of the object O is a mirror surface. The BRDF changes depending on the surface properties of the object O. At this time, a first BRDF at the first object point O1, which is denoted by reference numeral 1, has a wider distribution as compared to a second BRDF denoted by reference numeral 2 at the second object point O2. That is, the first object point O1 and the second object point O2 have different BRDFs.

A light beam from the first object point O1, which belongs to the first BRDF 1, includes, for example, the wavelengths of red light, blue light, and green light. A first light beam B1 from the first object point O1, which belongs to the first BRDF 1, passes through the first wavelength selection region 32 of the wavelength selection portion 14 and changes to, for example, blue light having a spectrum from a wavelength of 430 nm to a wavelength of 480 nm. A second light beam B2 from the first object point O1, which belongs to the first BRDF 1, passes through the second wavelength selection region 34 of the wavelength selection portion 14 and changes to, for example, red light having a spectrum from a wavelength of 620 nm to a wavelength of 680 nm.

A light beam B from the second object point O2, which belongs to the second BRDF 2, includes, for example, the wavelengths of red light, blue light, and green light. The light beam B from the second object point O2, which belongs to the second BRDF 2, is parallel or almost parallel to the optical axis L. The light beam B passes through the second wavelength selection region 34 of the wavelength selection portion 14 and changes to red light having a spectrum from a wavelength of 620 nm to a wavelength of 680 nm.

Here, the first object point O1 is transferred to a first image point I1 on the image sensor 24 by the imaging optical element 22. The second object point O2 is transferred to a second image point I2 on the image sensor 24 by the imaging optical element 22. Thus, the processing device 16 controls the image sensor (area sensor) 24 and performs image acquisition processing of capturing and acquiring an image by the image sensor 24 (step S101). That is, the image acquired by the image sensor 24 is sent as an electrical signal to the processing device 16.

Note that the image data at the image point I1 and the image data at the image point I2, which are captured by the image sensor 24, are colored in accordance with the scattering angle (including specularly reflected light) from the surface of the object O. For this reason, the obtained colors of the image points I1 and I2 depend on not the color of the surface itself of the object O but the wavelength selectively transmitted by the setting of the wavelength selection portion 14. Hence, as for the image data at the image points I1 and I2, which are obtained by the imaging portion 12 according to this embodiment, it can be considered that if the wavelength selection portion 14 is appropriately set, even the image of the surface of the same object O has a color different from the color of an image of a normal camera that does not use the wavelength selection portion 14.

In this embodiment, at least blue light and red light are received at the first image point I1 on the image sensor 24. That is, a pixel corresponding to the first image point I1 on the image sensor 24 receives blue light and red light. Hence, the processing device 16 recognizes that the light from the first object point O1 has passed through at least two types of wavelength selection regions 32 and 34. On the other hand, at the second image point I2, only red light is received by the image sensor 24. That is, a pixel corresponding to the second image point I2 on the image sensor 24 receives red light. Hence, the processing device 16 recognizes that the light from the second object point O2 has passed through only one type of wavelength selection region 34. The processing of outputting, by the processing device 16, the number of color channels that have received light in each pixel of the image sensor 24 is called color count estimation processing (received color count estimation processing). That is, the processing device 16 can acquire the number of colors of light received by the pixels corresponding to the image points I1 and I2 by the color count estimation processing of the processing device 16 (step S102).

However, as for how to count the number of colors, various methods can be considered depending on the manner to set background noise (dark current noise or the spectral performance of the image sensor 24 or the wavelength selection portion 14). For example, depending on the spectral performance of the image sensor 24, even if green light does not reach the image sensor 24, an electrical signal corresponding to green light may react by red light. To prevent this, the processing device 16 performs calibration for associating the number of colors with the number of wavelength selection portions 32 and 34 through which light beams have passed by offsetting background noise. By this calibration, the processing device 16 can acquire the correct number of colors.

It can be considered that the larger the number of colors of light received by each pixel is, the wider the BRDF (scattered light distribution) at the object point O1 of the object O is, and the smaller the number of colors of light received by each pixel is, the narrower the BRDF (scattered light distribution) at the object point O2 of the object O is. Hence, the processing device 16 acquires the number of colors at each of the image points I1 and I2 by the color count estimation processing for the image points I1 and I2, thereby identifying the difference between the BRDFs at the object points O1 and O2 (step S103).

Thus, the processing device 16 can capture light from the object O, which has passed through the wavelength selection portion 14 including at least two different wavelength selection regions 32 and 34, and acquire images corresponding to two different wavelength spectra including at least two different wavelengths. That is, the corresponding intensity ratios of the color channels that have received the light are different each other. Then, the processing device 16 can perform count estimation processing configured to estimate the number of colors based on the intensity ratio of color channels that have received the light in each of the pixels of the images corresponding to the at least two different wavelengths. And then, the processing device 16 can perform scattered light distribution identification processing configured to identify the scattered light distribution (BRDF) from the surface of the object O based on the number of colors.

The BRDF has correlation with the surface properties/shape of the object O. Hence, the processing device 16 can identify the difference of the surface properties between the object points O1 and O2 on the surface of the object O based on image data acquired by the imaging portion 12 using the light that has passed through the wavelength selection portion 14 (step S104). Note that the processing device 16 can perform surface state identification processing of directly identifying the difference of the surface properties/shape of the object O based on the number of colors of light received by each pixel without recognizing the difference of the BRDF between the object points O1 and O2. Here, the surface properties/shape can also be called as a surface state. That is, the processing device 16 preferably performs at least one of scattered light distribution identification processing configured to identify the scattered light distribution (BRDF) from the surface of the object O based on the number of colors and surface state identification processing configured to identify the state of the surface of the object O based on the number of colors. Hence, after the processing device 16 can performs surface state identification processing, the processing device 16 can performs scattered light distribution identification processing.

By using the optical inspection apparatus 10 according to this embodiment, the information (surface state) of the surface of the object O can be acquired in a noncontact state without spectrally dividing illumination into R, G, and B. In addition, if the surface of the object O is a mirror surface, image data is colored in accordance with the scattering angle (including specularly reflected light) from the surface of the object O. For this reason, if the BRDF can be acquired, the three-dimensional shape of the surface can be acquired (see Hiroshi Ohno and Takahiro Kamikawa, "One-shot BRDF imaging system to obtain surface properties," Optical Review volume 28, pages 655-661 (2021).). For example, an uneven defect at the object point O1 can be acquired as a three-dimensional shape.

Also, the optical inspection apparatus 10 according to this embodiment can arrange the wavelength selection portion 14 between the imaging portion 12 and the object O, that is, in front of the imaging portion 12. Hence, the optical inspection apparatus 10 can construct the optical system for any imaging portion (that is, the camera) 12. That is, the range of choice for the imaging portion 12 can be expanded by the optical inspection apparatus 10 according to this embodiment. That is, with the configuration in which the light that has passed through the wavelength selection portion 14 passes through the imaging optical element (imaging lens) 22 for image capturing, the wavelength selection portion 14 can easily be arranged.

As described above, according to this embodiment, it is possible to provide the optical inspection method for acquiring the information of the surface of the object O, the non-transitory storage medium storing the optical inspection program, the processing device 16, and the optical inspection apparatus 10.

In addition, the wavelength selection portion 14 is supported by a support portion 15 between the object O and the imaging portion 12. The support portion 15 can rotate the wavelength selection portion 14 about, for example, the optical axis L. If the BRDF has special anisotropy, the processing device 16 can acquire an accurate BRDF distribution by capturing the surface of the object O by the image sensor 24 while rotating the wavelength selection portion 14 by the support portion 15.

(First Modification)

The optical inspection apparatus 10 according to the first modification of the first embodiment will be described.

In this modification, each pixel of the image sensor 24 includes three color channels of red, blue, and green. That is, the image sensor 24 can receive blue light with a wavelength of 450 nm, red light with a wavelength of 650 nm, and green light with a wavelength of 530 nm by independent color channels.

Also, as shown in FIG. 1, the wavelength selection portion 14 includes the first wavelength selection region 32, the second wavelength selection region 34, and the third wavelength selection region 36. The third wavelength selection region 36 passes a wavelength spectrum including a light beam of a third wavelength. On the other hand, the third wavelength selection region 36 substantially shields the light beams of the first wavelength and the second wavelength. For example, the first wavelength is blue light with a wavelength of 450 nm, the second wavelength is red light with a wavelength of 650 nm, and the third wavelength is green light with a wavelength of 530 nm. However, the present invention is not limited to this, and any wavelengths can be used. The third wavelength selection region 36 of the wavelength selection portion 14 according to the first embodiment has been described as a shielding portion. In this modification, the third wavelength selection region 36 is used as a wavelength selection region configured to pass the third wavelength.

A third light beam B3 from the first object point O1, which belongs to the first BRDF 1, passes through the third wavelength selection region 36 of the wavelength selection portion 14 and changes to, for example, green light having a spectrum from a wavelength of 520 nm to a wavelength of 580 nm. The green light is transferred from the first object point O1 to the first image point I1. Hence, the image sensor 24 receives three color light components including red light, blue light, and green light at the first image point I1. By color count estimation processing, the processing device 16 estimates that the number of colors at the first image point I1 is 3. While the number of colors at the first image point I1 to which the image at the first object point O1 is transferred is 3, the number of colors at the second image point I2 to which the image at the second object point O2 is transferred is 1. The difference of the number of colors between the first object point O1 and the second object point O2 becomes clearer.

Hence, according to this modification, it is possible to provide the optical inspection method capable of more accurately acquiring the information of the surface of the object O and performing more accurate optical inspection, the non-transitory storage medium storing the optical inspection program, the processing device 16, and the optical inspection apparatus 10.

(Second Modification)

The optical inspection apparatus 10 according to the second modification of the first embodiment will be described with reference to FIG. 3. The optical inspection apparatus 10 according to this modification is basically the same as the optical inspection apparatus 10 according to the first embodiment. Differences will be described below.

Figure 3:
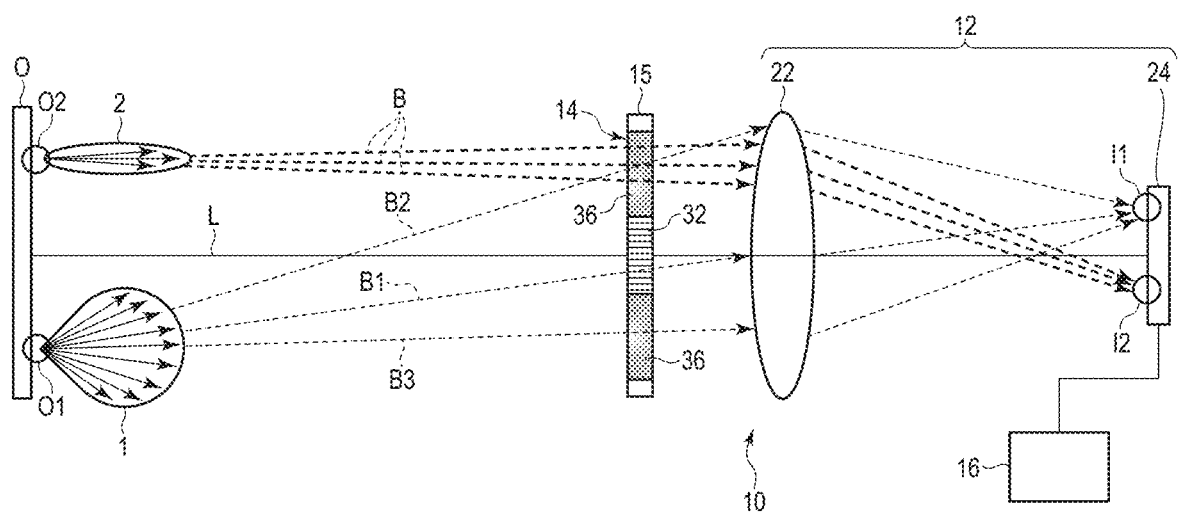
FIG. 3 is a schematic sectional view showing the schematic configuration of an optical inspection apparatus according to a modification of the first embodiment.

In the example of the wavelength selection portion 14 shown in FIG. 3, the third wavelength selection region 36 is used in place of the second wavelength selection region 34 shown in FIG. 1. As shown in FIG. 3, for example, the third wavelength selection region 36 is arranged in two portions of the wavelength selection portion 14. Thus, the wavelength selection portion 14 can repetitively use a region, for example, the wavelength selection region 36 configured to pass light of the same wavelength spectrum and shield light of a different wavelength spectrum. Hence, the third wavelength selection region 36 may be arranged in three portions of the wavelength selection portion 14.

Even if the wavelength selection portion 14 is configured in this way, the processing device 16 outputs a result that the number of colors at the first image point I1 corresponding to the first object point O1 is 2, and the number of colors at the second image point I2 corresponding to the second object point O2 is 1. This generates a difference between the number of colors at the first image point I1 and that at the second image point I2. Hence, the processing device 16 can identify the difference between the first BRDF 1 at the first object point O1 corresponding to the first image point I1 and the second BRDF 2 at the second object point O2 corresponding to the second image point I2.

The wavelength selection portion 14 can decrease the types of wavelength spectra to be discriminated by the image sensor 24 by repetitively using the wavelength selection region 36 of the same type. That is, if the wavelength selection region 36 of the wavelength selection portion 14 is arranged repetitively at least twice or more, a sufficient effect can be obtained even if the number of color channels of the image sensor 24 is decreased, the optical performance of the wavelength selection portion 14 is deteriorated, for example, the wavelength selection portion 14 is changed to an inexpensive one.

However, if the wavelength selection region 36 is repetitively arranged, the predetermined wavelengths of light components that pass through the two wavelength selection regions 32 and 36 adjacent to each other in the wavelength selection portion 14 are different from each other. That is, since the predetermined wavelengths of light components that pass through the two wavelength selection regions 32 and 36 adjacent to each other are different, it is possible to identify whether the BRDF is wide, and the light passes through the two wavelength selection regions 32 and 36 simultaneously or whether the BRDF is narrow, and the light passes through one of the two wavelength selection regions 32 and 36.

As described above, according to this modification, it is possible to provide the optical inspection method for acquiring the information of the surface of the object O, the non-transitory storage medium storing the optical inspection program, the processing device 16, and the optical inspection apparatus 10.

Second Embodiment

An optical inspection apparatus 10 according to this embodiment will be described in detail with reference to FIGS. 4 and 5. The optical inspection apparatus 10 according to this embodiment is basically the same as the optical inspection apparatus 10 according to the first embodiment. Differences will be described below.

Figure 4:
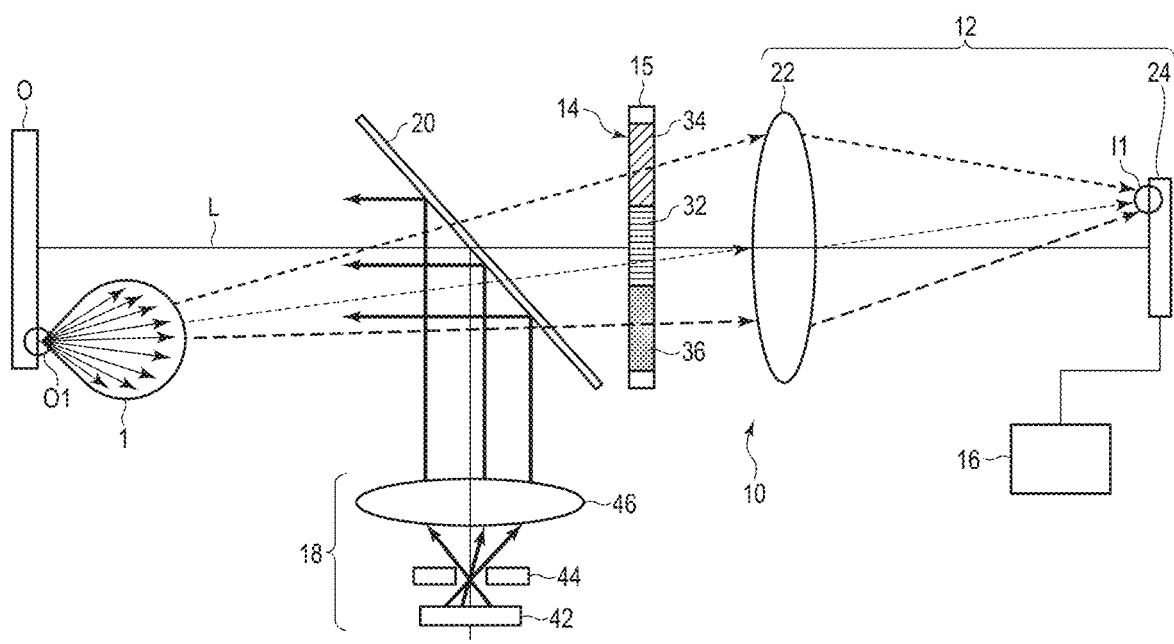
FIG. 4 is a schematic sectional view showing the schematic configuration of an optical inspection apparatus according to the second embodiment.

FIG. 4 shows a sectional view taken along an optical axis L of an imaging optical element 22 of the optical inspection apparatus 10 according to this embodiment. The optical axis L is orthogonal to an image sensor 24.

The optical inspection apparatus 10 according to this embodiment further includes an illumination portion 18 and a beam splitter 20.

A wavelength selection portion 14 according to this embodiment includes a plurality of (here, three) wavelength selection regions 32, 34, and 36. The wavelength selection regions 32, 34, and 36 are each assumed to be formed into, for example, a stripe shape or a linear shape in a plane orthogonal to the optical axis L of the imaging optical element 22. That is, the wavelength selection regions 32, 34, and 36 of the wavelength selection portion 14 are assumed to be extend in a direction orthogonal to the sheet surface of FIG. 4.

In the cross section shown in FIG. 4, the plurality of wavelength selection regions 32, 34, and 36 are arranged. That is, the cross section shown in FIG. 4 includes a direction to arrange the plurality of wavelength selection regions 32, 34, and 36 side by side. On the other hand, the plurality of wavelength selection regions 32, 34, and 36 do not change in the direction orthogonal to the cross section shown in FIG. 4 (that is, the direction orthogonal to the sheet surface of FIG. 4).

The illumination portion 18 irradiates the surface of an object O with light. The illumination portion 18 includes a light source 42, an opening 44, and an illumination lens 46. The opening 44 is assumed to have a slit shape. That is, the opening 44 is assumed to be, for example, 200 mm long in the longitudinal direction and 0.8 mm long in the widthwise direction. Light that has passed through the opening 44 has a stripe shape. FIG. 4 shows a sectional view of the opening 44 in the widthwise direction.

The illumination lens 46 is assumed to be, for example, a cylindrical lens, and is assumed to be 200 mm long in the longitudinal direction. The focal length is assumed to be, for example, 50 mm. FIG. 4 shows a sectional view including the widthwise direction. The slit-shaped opening 44 is arranged on the focal plane of the illumination lens (cylindrical lens) 46.

As the light source 42, for example, an LED is used. As the LED serving as the light source 42, a plurality of surface emission type LEDs each having a size of, for example, 3 mm×3 mm are arrayed in the direction orthogonal to the sheet surface of FIG. 4.

With the above-described configuration, in the cross section shown in FIG. 4, the illumination portion 18 can generate parallel light. The illumination portion 18 irradiates the same cross section shown in FIG. 4 with the parallel light. The parallel light irradiates the surface of the object O along the optical axis L of the imaging optical element (lens) 22 via the beam splitter 20. Such an illumination method is called coaxial lighting.

The operation principle of the optical inspection apparatus 10 according to this embodiment will be described below with reference to FIGS. 4 and 5.

Figure 5:
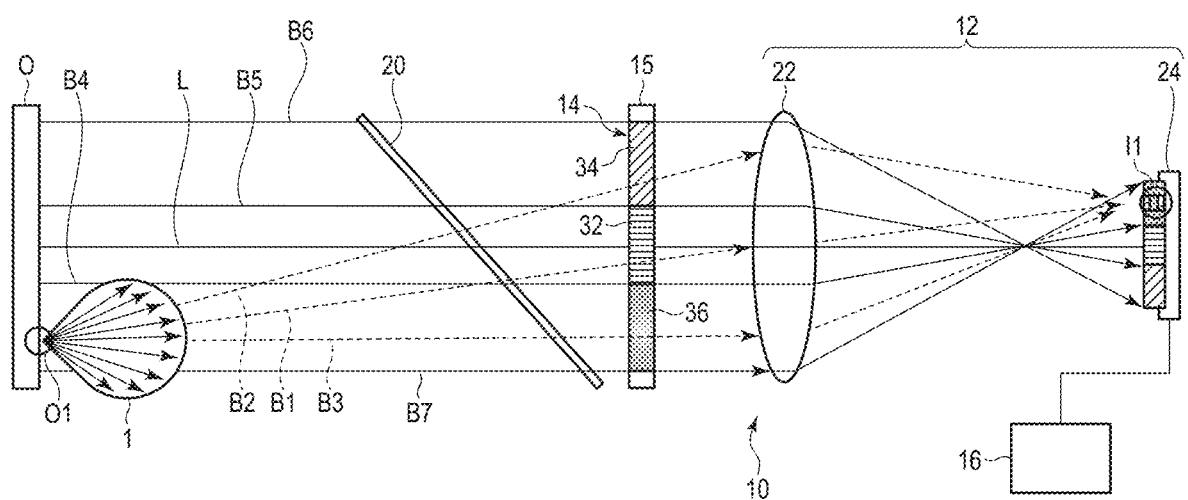
FIG. 5 is a schematic view for explaining the action of the optical inspection apparatus according to the second embodiment.

In FIG. 5, the illumination portion 18 is not illustrated. Assume that the surface of the object O shown in FIG. 5 is a mirror surface, and the surface of the object O is orthogonal to the optical axis L of the imaging optical element (lens) 22. At this time, parallel light that has entered from the illumination portion 18 to the surface of the object O is reflected by the surface of the object O and directed to an imaging portion 12 along the optical axis L. At this time, regions of the surface of the object O are captured in different colors in accordance with the wavelength selection regions 32, 34, and 36 of the wavelength selection portion 14.

That is, in a region of the surface of the object O where parallel light between a fourth light beam B4 and a fifth light beam B5 is reflected, the light passes through the first wavelength selection region 32 and changes to blue light. In a region of the surface of the object O where parallel light between the fifth light beam B5 and a sixth light beam B6 is reflected, the light passes through the second wavelength selection region 34 and changes to red light. In a region of the surface of the object O where parallel light between a seventh light beam B7 and the fourth light beam B4 is reflected, the light passes through the third wavelength selection region 36 and changes to green light. That is, if the surface of the object O is a flat surface like a mirror surface and, for example, no unevenness exists, a processing device 16 can estimate the number of colors of an image acquired by the image sensor 24 as 1 all over the imaging region.

At this time, assume that an uneven defect exists at a first object point O1 in FIGS. 4 and 5. If the first object point O1 is irradiated with the parallel light from the illumination portion 18, the BRDF at the first object point O1 spreads as compared to a case where the surface of the object O is a flat surface like a mirror surface, and no unevenness exists. The light beam from the object point O1, for example, passes through all the first wavelength selection region 32, the second wavelength selection region 34, and the third wavelength selection region 36 and forms an image as a first image point I1 on the image sensor 24. That is, the number of colors of the first image point I1 corresponding to the first object point O1 is 3. The processing device 16 can thus immediately recognize that the BRDF has a wide distribution at the first object point O1. That is, without relatively comparing the number of colors at each object point, the processing device 16 can absolutely evaluate the size of the distribution of the BRDF in accordance with the absolute value of the number of colors.

As described above, according to this embodiment, it is possible to provide the optical inspection method for acquiring the information of the surface of the object O, the non-transitory storage medium storing the optical inspection program, the processing device 16, and the optical inspection apparatus 10.

Third Embodiment

An optical inspection apparatus 10 according to this embodiment will be described in detail with reference to FIG. 6. The optical inspection apparatus 10 according to this embodiment is basically the same as the optical inspection apparatus 10 according to the second embodiment. Differences will be described below.

Figure 6:
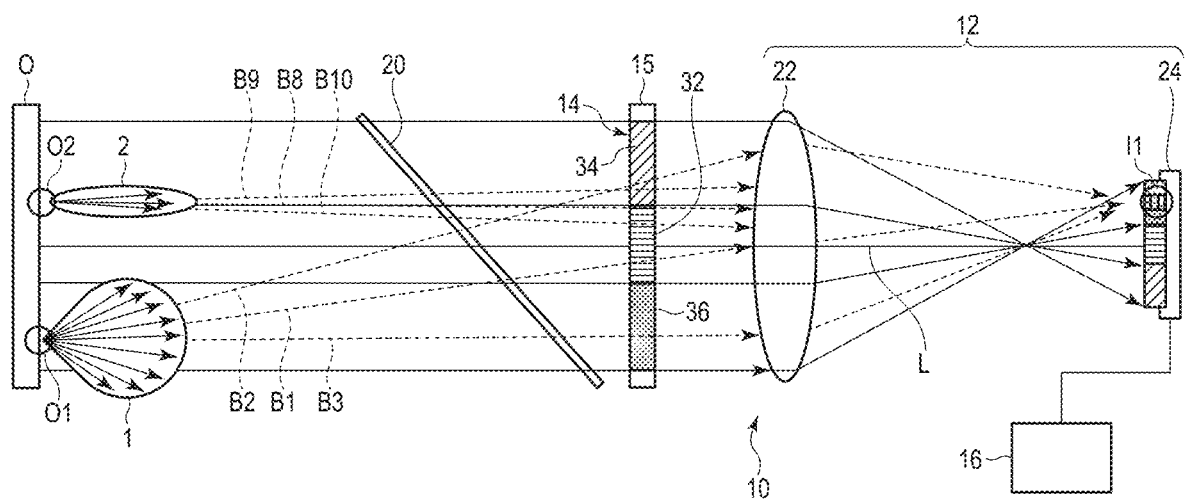
FIG. 6 is a schematic view for explaining the action of the optical inspection apparatus according to the second embodiment.

FIG. 6 shows a sectional view of the optical inspection apparatus 10 according to this embodiment. As shown in FIG. 6, BRDFs at a first object point O1 and a second object point O2 are defined as a first BRDF 1 and a second BRDF 2, respectively. Assume that the distribution of the first BRDF 1 is wider than that of the second BRDF 2.

In a wavelength selection portion 14, a first wavelength selection region 32, a second wavelength selection region 34, and a third wavelength selection region 36 are formed. The second wavelength selection region 34 and the third wavelength selection region 36 are of the same type. That is, if the same light is made to enter the second wavelength selection region 34 and the third wavelength selection region 36, light components of the same wavelength spectrum are passed, and the remaining components are shielded. Assume here that, for example, the first wavelength selection region 32 passes blue light, and the second wavelength selection region 34 and the third wavelength selection region 36 pass red light.

Light beams included in the first BRDF 1 are, for example, a first light beam B1, a second light beam B2, and a third light beam B3. The first light beam B1 passes through the first wavelength selection region 32. The second light beam B2 passes through the second wavelength selection region 34. The third light beam B3 passes through the third wavelength selection region 36. Hence, two color light components, that is, red light and blue light are captured at an image point I1 on an image sensor 24.

On the other hand, light beams included in the second BRDF 2 are, for example, an eighth light beam B8, a ninth light beam B9, and a 10th light beam B10. The eighth light beam B8 passes through the boundary between the first wavelength selection region 32 and the second wavelength selection region 34. The ninth light beam B9 passes through the second wavelength selection region 34. The 10th light beam B10 passes through the first wavelength selection region 32. Hence, two color light components, that is, red light and blue light are captured at an image point I2 on the image sensor 24. At this time, a processing device 16 identifies that both the number of colors corresponding to the first object point O1 and that corresponding to the second object point O2 are 2. The distribution of the first BRDF 1 is wider than that of the second BRDF 2. However, it may be impossible to discriminate or identify the difference of the BRDF, that is, the difference of the surface properties of the object O based on the number of colors.

To discriminate this, a wavelength selection region different from the first wavelength selection region 32 and the second wavelength selection region 34 is formed as the third wavelength selection region 36. For example, assume that light that has passed through the second wavelength selection region 34 changes to red light, and light that has passed through the third wavelength selection region 36 changes to green light. In this case, the number of colors captured at the image point I1 of the first object point O1 is 3, and the number of colors for the second object point O2 is 2. This can identify the difference of the BRDF.

That is, the processing device 16 can identify the scattered light (BRDF) from the surface of the object O by capturing the light from the object O using light that has passed through the wavelength selection portion 14 including the wavelength selection regions 32, 34, and 36 configured to selectively pass light components of at least three different predetermined wavelengths, acquiring images corresponding to at least three different wavelength spectra, and estimating the number of wavelength selection regions 32, 34, and 36 that have passed the light (the number of colors of light received by the image sensor 24) based on the images corresponding to the at least three different wavelength spectra.

Here, the number of colors of the eighth light beam B8 at the image point I2 can be 2 because it passes through the boundary between the first wavelength selection region 32 and the second wavelength selection region 34. Thus, the number of colors of the light that passes through the boundary between the first wavelength selection region 32 and the second wavelength selection region 34 can be 2. Hence, considering the light that passes through the boundary between the wavelength selection regions 32 and 34 or the boundary between the wavelength selection regions 32 and 36, at least three wavelength selection regions 32, 34, and 36 are preferably prepared in the wavelength selection portion 14. That is, if the number of colors acquired in each pixel is set to 3 or more at maximum, the BRDF can be identified including the light that passes through the boundary between the wavelength selection regions 32 and 34 or the boundary between the wavelength selection regions 32 and 36.

As described above, according to this embodiment, it is possible to provide the optical inspection method for acquiring the information of the surface of the object O, the non-transitory storage medium storing the optical inspection program, the processing device 16, and the optical inspection apparatus 10.

Fourth Embodiment

An optical inspection apparatus 10 according to this embodiment will be described in detail with reference to FIG. 7. The optical inspection apparatus 10 according to this embodiment is basically the same as the optical inspection apparatus 10 according to the second embodiment. Differences will be described below.

Figure 7:
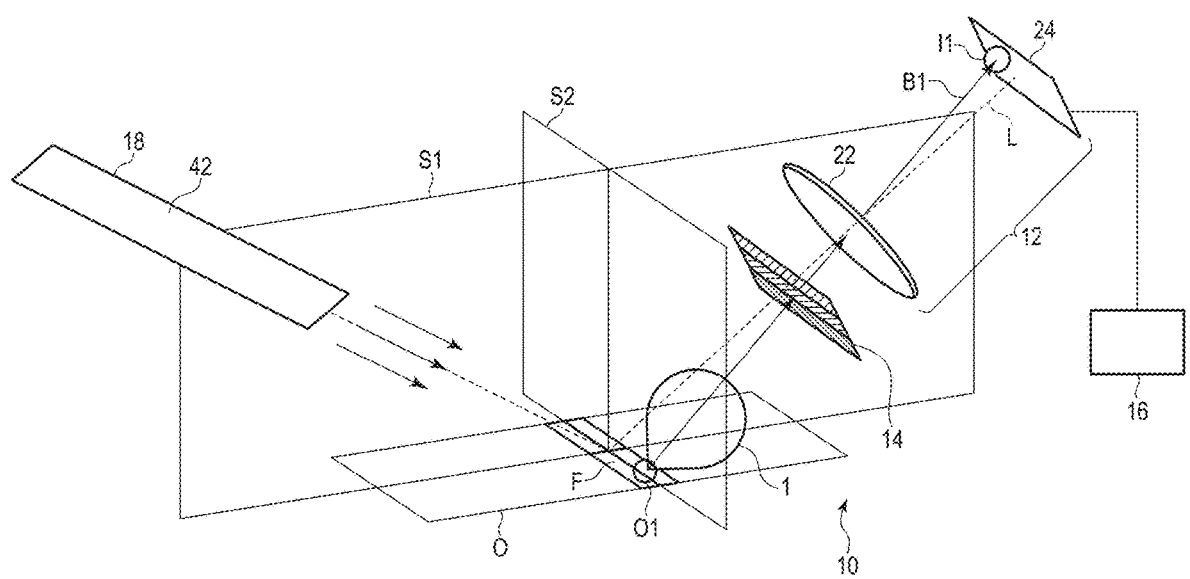
FIG. 7 is a schematic sectional view showing the schematic configuration of an optical inspection apparatus according to the third embodiment.

FIG. 7 shows a perspective view of the optical inspection apparatus 10 according to this embodiment.

In the optical inspection apparatus 10 according to this embodiment, an illumination portion 18 is different from the illumination portion 18 of the optical inspection apparatus 10 according to the second embodiment.

In the optical inspection apparatus 10 shown in FIG. 7, on a cross section including an optical axis L and the array direction of a wavelength selection portion 14, light from the illumination portion 18 is assumed to be parallel light. The direction of the optical axis L marches a direction orthogonal to an image sensor 24. Hence, this cross section can also be expressed as a cross section including the direction orthogonal to the image sensor 24 and the array direction of the wavelength selection portion 14. This is defined as a first cross section S1. Also, in a light beam orthographically projected to the first cross section S1, light from the illumination portion 18 is assumed to be parallel light. On the other hand, a cross section orthogonal to the first cross section S1 is defined as a second cross section S2. In a light beam orthographically projected to the second cross section S2, light from the illumination portion 18 is assumed to be not parallel light but diffused light. Hence, the illumination portion 18 illuminates the surface of an object O with illumination light that is parallel light in the cross section S1 defined by the direction in which the first wavelength selection region 32 and the second wavelength selection region 34 are arrayed in the wavelength selection portion 14 and the optical axis L of an imaging optical element 22 and is diffused light in the cross section orthogonal to the first cross section S1.

The wavelength selection portion 14 includes a plurality of wavelength selection regions 32, 34, and 36. The wavelength selection regions 32, 34, and 36 are each assumed to have a stripe shape. The wavelength selection portion 14 includes the plurality of wavelength selection regions 32, 34, and 36 that cross the first cross section S1. That is, the first cross section S1 shown in FIG. 7 includes the direction in which the wavelength selection regions 32, 34, and 36 are arranged. On the other hand, on the second cross section S2 orthogonal to the first cross section S1 shown in FIG. 7, the wavelength selection regions 32, 34, and 36 do not change. For example, if the second cross section S2 crosses the first wavelength selection region 32, the second cross section S2 does not cross the second wavelength selection region 34 and the third wavelength selection region 36. Similarly, if the second cross section S2 crosses the second wavelength selection region 34, the second cross section S2 does not cross the first wavelength selection region 32 and the third wavelength selection region 36. If the second cross section S2 crosses the third wavelength selection region 36, the second cross section S2 does not cross the first wavelength selection region 32 and the second wavelength selection region 34.

The illumination portion 18 irradiates the surface of the object O to form an irradiation field F on the surface of the object O. A first object point O1 in the irradiation field F is formed into an image at a first image point I1 on the image sensor 24 by the imaging optical element (imaging lens) 22. At the first object point O1, the BRDF is a first BRDF 1. A first light beam B1 is included in the first BRDF 1.

In the light beam orthographically projected to the first cross section S1, the spread of the distribution of the first BRDF 1 can be identified by the number of colors of light passed through the wavelength selection regions 32, 34, and 36 of the wavelength selection portion 14 and received by a pixel corresponding to the image point I1 on the image sensor 24. That is, based on the image of light received by the image sensor 24, a processing device 16 identifies the spread of the BRDF at the object point O1 based on the number of colors of light received by the image sensor 24.

Since the light with which the illumination portion 18 irradiates the surface of the object O is parallel light, in the light beam orthographically projected to the first cross section S1, the angle of view is narrow in an imaging portion 12. That is, in the light beam orthographically projected to the first cross section S1, the imaging range of the imaging portion 12 is narrow.

On the other hand, on the second cross section S2 or a cross section parallel to that, the number of wavelength spectrums (number of colors) that enter the image sensor 24 is constant. This is because on the second cross section S2 or the cross section parallel to that, the wavelength selection regions of the wavelength selection portion 14 do not change. In the light beam orthographically projected to the second cross section S2, the light from the illumination portion 18 is diffused light. Hence, the angle of view is wide in the imaging portion 12.

Thus, in the image acquired by the image sensor 24, the angle of view is narrow in a first direction (the direction along the first cross section S1) of the two directions orthogonal to the optical axis L, but can be made wide in a second direction (the direction along the second cross section S2) orthogonal to the first direction. In addition, the number of colors at the first image point I1 is the number of colors in the light beam orthographically projected to the first cross section S1.

Thus, the optical inspection apparatus 10 according to this embodiment can make the whole angle of view wide as compared to a case where the light from the illumination portion 18 is completely parallel light. Also, since the wavelength selection regions 32, 34, and 36 are each formed into a stripe shape, the whole angle of view can be made wide as compared to the otherwise case.

Hence, according to this embodiment, it is possible to provide the optical inspection method capable of more accurately acquiring the information of the surface of the object O and performing more accurate optical inspection, the non-transitory storage medium storing the optical inspection program, the processing device 16, and the optical inspection apparatus 10.

(Examples of Wavelength Selection Portion 14)

FIGS. 8, 9, 10, and 11 show various examples of the wavelength selection portion 14. The wavelength selection portion 14 shown in each of FIGS. 8, 9, 10, and 11 is arranged to be orthogonal to the optical axis L. The wavelength selection portion 14 shown in each of FIGS. 8, 9, 10, and 11 can be used while being appropriately rotated about the optical axis L by, for example, the support portion 15 (see FIG. 1).

Figure 8:
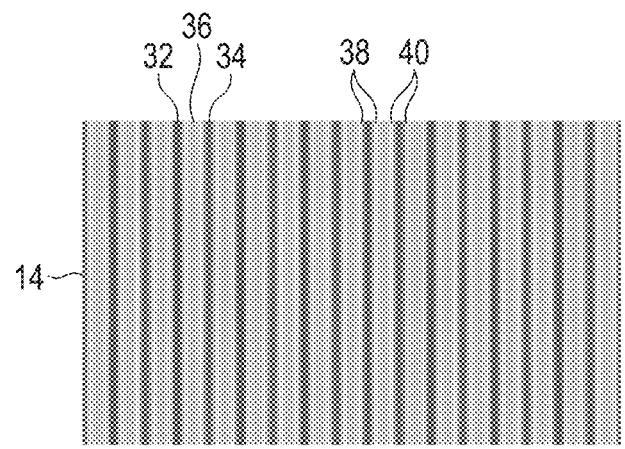
FIG. 8 shows an example of the wavelength selection portions of the optical inspection apparatuses according to the first to third embodiments.

In the wavelength selection portion 14 shown in FIG. 8, in addition to the above-described wavelength selection region 32 configured to pass blue, the wavelength selection region 34 configured to pass red, and the wavelength selection region 36 configured to pass green, for example, a light blue wavelength selection region 38 is disposed at the boundary between the blue and green wavelength selection regions. In addition, for example, a yellow wavelength selection region 40 is disposed at the boundary between the red and green wavelength selection regions. In the example of the wavelength selection portion 14 shown in FIG. 8, the blue, red, and green wavelength selection regions 32, 34, and 36 are formed in a stripe shape in almost the same width. The light blue wavelength selection region 38 and the yellow wavelength selection region 40 are formed in a width narrower than the blue, red, and green wavelength selection regions 32, 34, and 36. Note that the light blue wavelength selection region 38 and the yellow wavelength selection region 40 are formed in almost the same width.

Figure 9:
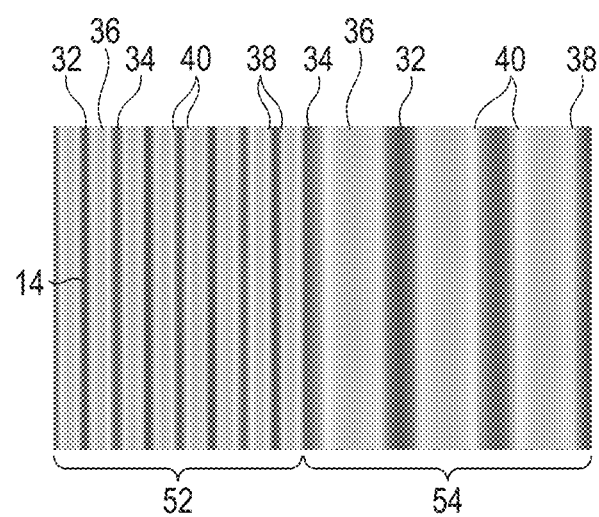
FIG. 9 shows an example of the wavelength selection portions of the optical inspection apparatuses according to the first to third embodiments.

The wavelength selection portion 14 shown in FIG. 9 includes a first region 52 and a second region 54. The first region 52 and the second region 54 are arranged in the left-and-right direction in FIG. 9. The first region 52 is formed like the wavelength selection portion 14 shown in FIG. 8. In the second region 54, each wavelength selection region is formed to be wider than in the wavelength selection portion 14 shown in FIG. 8.

Figure 10:
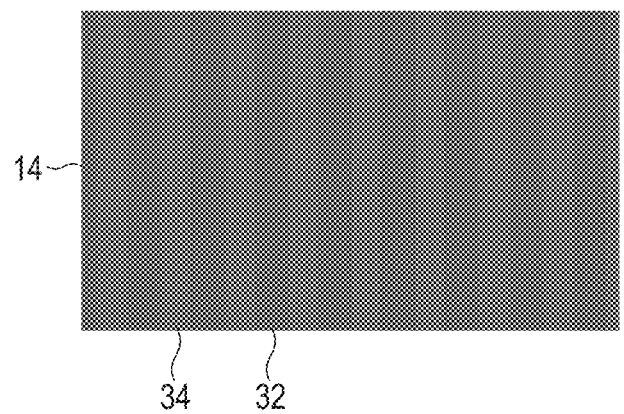
FIG. 10 shows an example of the wavelength selection portions of the optical inspection apparatuses according to the first to third embodiments.

The wavelength selection portion 14 shown in FIG. 10 includes the wavelength selection region 32 configured to pass blue, and the wavelength selection region 34 configured to pass red. The wavelength selection regions 32 and 34 are repeated in the left-and-right direction of the sheet surface of FIG. 10. The width of each of the wavelength selection regions 32 and 34 is, for example, constant.

Figure 11:
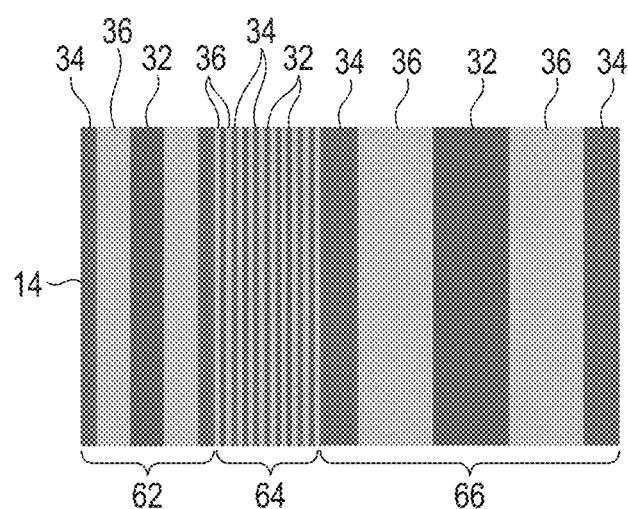
FIG. 11 shows an example of the wavelength selection portions of the optical inspection apparatuses according to the first to third embodiments.

The wavelength selection portion 14 shown in FIG. 11 includes a first region 62, a second region 64, and a third region 66. The first region 62, the second region 64, and the third region 66 are arranged in the left-and-right direction in FIG. 11. In the first region 62, the wavelength selection regions 32, 34, and 36 are formed in a width wider than in the second region 64. In the second region 64, the wavelength selection regions 32, 34, and 36 are formed in a width narrower than in the third region 66. In the third region 66, the wavelength selection regions 32, 34, and 36 are formed in a width wider than in the second region 64.

According to at least one embodiment described above, it is possible to provide the optical inspection method for acquiring the information of the surface of an object, the non-transitory storage medium storing the optical inspection program, the processing device 16, and the optical inspection apparatus 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An optical inspection method comprising:
   acquiring an image by capturing the image with an image sensor, using light from a surface of an object in such a manner as to make the light enter a wavelength selection portion configured to selectively pass light components of a plurality of predetermined wavelengths different from each other, and then to allow the light components of the plurality of predetermined wavelengths that have selectively passed through the wavelength selection portion to enter an imaging optical element configured to collect the light from one point of the surface of the object onto a conjugate image point on the image sensor,
   the wavelength selection portion being configured to color the light in accordance with a scattering angle at the surface of the object, the light including at least one of scattering light and/or specularly reflected light,
   the image sensor including color channels configured to discriminately receive the light components of the plurality of predetermined wavelengths,
   performing color count estimation processing to estimate, as the number of colors, the number of channels of the color channels that have received the light in each pixel of the image, and
   performing at least one of scattered light distribution identification processing to identify a scattered light distribution as Bidirectional Reflectance Distribution Function (BRDF) from the surface of the object based on the number of colors and surface state identification processing to identify a state of the surface of the object based on the number of colors.

2. The method according to claim 1, wherein
   in the wavelength selection portion,
   a first region of the wavelength selection portion passes a light component of a first wavelength from the surface of the object and shields light components of a second wavelength and a third wavelength, which are different from the first wavelength,
   a second region of the wavelength selection portion passes the light component of the second wavelength from the surface of the object and shields the light components of the first wavelength and the third wavelength,
   a third region of the wavelength selection portion passes the light component of the third wavelength from the surface of the object and shields the light components of the first wavelength and the second wavelength,
   in the image sensor, the color channels of the image sensor discriminately receive the light component of the first wavelength, the light component of the second wavelength, and the light component of the third wavelength, and
   in the color count estimation processing, in each pixel of the image acquired by the image sensor, the number of channels of the color channels that have received the light is estimated as the number of colors.

3. The method according to claim 1, wherein
in the wavelength selection portion,
a first region of the wavelength selection portion passes a light component of a first wavelength from the surface of the object and shields a light component of a second wavelength different from the first wavelength,
a second region of the wavelength selection portion passes the light component of the second wavelength from the surface of the object and shields the light component of the first wavelength, and
the method further comprises
illuminating the surface of the object with illumination light that is parallel light in a cross section defined by a direction in which the first region and the second region are arrayed in the wavelength selection portion and a direction orthogonal to a light receiving surface of the image sensor and is diffused light in a cross section orthogonal to the cross section,
wherein
the wavelength selection portion is parallel to the light receiving surface of the image sensor, and
the direction in which the first region and the second region are arrayed in the wavelength selection portion is parallel to the light receiving surface.

4. A non-transitory storage medium storing an optical inspection program, the optical inspection program causing a computer to execute:
image acquisition processing of acquiring an image by capturing the image with an image sensor, using light from a surface of an object in such a manner as to make the light enter a wavelength selection portion including a first region configured to pass a light component of a first wavelength and shield a light component of a second wavelength different from the first wavelength, and a second region configured to pass the light component of the second wavelength and shield the light component of the first wavelength, and then to allow the light components that have selectively passed through the wavelength selection portion to enter an imaging optical element configured to collect the light from one point of the surface of the object onto a conjugate image point on the image sensor,
the wavelength selection portion being configured to color the light in accordance with a scattering angle at the surface of the object, the light including at least one of scattering light and/or specularly reflected light,
the image sensor including color channels configured to discriminately receive the light component of the first wavelength and the light component of the second wavelength;
color count estimation processing to estimate, as the number of colors, the number of channels of the color channels that have received the light in each pixel of the image; and
at least one of scattered light distribution identification processing to identify a scattered light distribution as Bidirectional Reflectance Distribution Function (BRDF) from the surface of the object based on the number of colors and surface state identification processing to identify a state of the surface of the object based on the number of colors.

5. A processing device including a processor configured to:
acquire an image by capturing the image with an image sensor, using light from a surface of an object in such a manner as to make the light enter a wavelength selection portion configured to selectively pass light components of a plurality of predetermined wavelengths different from each other, and then to allow the light components of the plurality of predetermined wavelengths that have selectively passed through the wavelength selection portion to enter an imaging optical element configured to collect the light from one point of the surface of the object onto a conjugate image point on the image sensor,
the wavelength selection portion being configured to color the light in accordance with a scattering angle at the surface of the object, the light including at least one of scattering light and/or specularly reflected light,
the image sensor including color channels configured to discriminately receive the light components of the plurality of predetermined wavelengths;
perform color count estimation processing to estimate, as the number of colors, the number of channels of the color channels that have received the light in each pixel of the image corresponding to wavelength spectra of the plurality of predetermined wavelengths; and
perform at least one of scattered light distribution identification processing to identify a scattered light distribution as Bidirectional Reflectance Distribution Function (BRDF) from the surface of the object based on the number of colors and surface state identification processing to identify a state of the surface of the object based on the number of colors.

6. An optical inspection apparatus comprising:
a wavelength selection portion including a first region configured to pass a light component of a first wavelength from a surface of an object and shield a light component of a second wavelength different from the first wavelength, and a second region configured to pass the light component of the second wavelength from the surface of the object and shield the light component of the first wavelength;
an image sensor including color channels configured to discriminately receive the light component of the first wavelength and the light component of the second wavelength, which have passed through the wavelength selection portion;
an imaging optical element configured to collect a light beam group exiting from an object point on the surface of the object to an image point on the image sensor; and
a processing device defined in claim 5,
wherein the imaging optical element is provided between the wavelength selection portion and the image sensor.

7. The apparatus according to claim 6, wherein each of the first region and the second region of the wavelength selection portion has a stripe shape in a plane orthogonal to an optical axis of the imaging optical element.

8. The apparatus according to claim 6, wherein the second region is arranged in at least two portions of the wavelength selection portion.

9. The apparatus according to claim 6, further comprising an illumination portion configured to irradiate the surface of the object with light.

10. The apparatus according to claim 9, wherein the illumination portion is configured to irradiate a cross section including the surface of the object, the wavelength selection portion with the first region and the second region, the imaging optical element, and the image sensor with parallel light.

11. The apparatus according to claim 9, wherein the illumination portion is configured to irradiate the surface of the object with illumination light
- that is parallel light in a cross section defined by a direction in which the first region and the second region are arrayed in the wavelength selection portion and the optical axis of the imaging optical element and
- that is diffused light in a cross section defined by the optical axis and a direction orthogonal to the direction in which the first region and the second region are arrayed in the wavelength selection portion, wherein
- the wavelength selection portion is parallel to a light receiving surface of the image sensor, and
- the direction in which the first region and the second region are arrayed in the wavelength selection portion is parallel to the light receiving surface of the image sensor.

12. The apparatus according to claim 6, further comprising a support portion configured to support the wavelength selection portion and rotate the wavelength selection portion about an optical axis of the imaging optical element.

* * * * *